United States Patent [19]

Xie et al.

[11] Patent Number: 4,917,711
[45] Date of Patent: Apr. 17, 1990

[54] ADSORBENTS FOR USE IN THE SEPARATION OF CARBON MONOXIDE AND/OR UNSATURATED HYDROCARBONS FROM MIXED GASES

[75] Inventors: Youchang Xie; Naiyu Bu; Jun Liu; Ge Yang; Jianguo Qiu; Naifang Yang; Youchi Tang, all of Beijing, China

[73] Assignee: Peking University, Beijing, China

[21] Appl. No.: 127,196

[22] Filed: Dec. 1, 1987

[51] Int. Cl.$^4$ .............................................. B01D 53/04
[52] U.S. Cl. ......................................... 55/68; 55/74; 55/75; 55/387; 55/389; 423/247
[58] Field of Search ............... 55/63, 66, 68, 74, 75, 55/387, 389; 423/247

[56] References Cited

U.S. PATENT DOCUMENTS

| | | | |
|---|---|---|---|
| 3,476,508 | 11/1969 | Kearby et al. | 423/247 X |
| 3,501,897 | 3/1970 | Helden et al. | 55/74 X |
| 3,549,719 | 12/1970 | Duyverman et al. | 423/247 X |
| 3,649,177 | 3/1972 | Rosback | 55/75 X |
| 3,651,159 | 3/1972 | Long et al. | |
| 3,789,106 | 1/1974 | Hay | 423/247 |
| 3,812,652 | 5/1974 | Carr et al. | 55/74 X |
| 3,812,653 | 5/1974 | Massoth et al. | 55/74 X |
| 3,914,377 | 10/1975 | Anderson et al. | 423/247 X |
| 4,019,879 | 4/1977 | Rabo et al. | 55/75 X |
| 4,158,643 | 6/1979 | Sinha | 423/247 X |
| 4,185,082 | 1/1980 | Sinha | 423/247 X |
| 4,242,226 | 12/1980 | Siren | 55/74 X |
| 4,331,644 | 5/1982 | Ritscher | 423/247 X |
| 4,470,829 | 9/1984 | Hirai et al. | 55/68 |
| 4,587,114 | 5/1986 | Hirai et al. | 423/247 |
| 4,713,090 | 12/1987 | Yokoe et al. | 55/74 X |

FOREIGN PATENT DOCUMENTS

| | | | |
|---|---|---|---|
| 2130983 | 12/1971 | Fed. Rep. of Germany | 55/75 |
| 2841565 | 4/1980 | Fed. Rep. of Germany | 55/75 |
| 662460 | 12/1951 | United Kingdom | 423/247 |
| 2117265 | 10/1988 | United Kingdom | |

OTHER PUBLICATIONS

"Making and Using CO", Chemtech, May 1975, pp. 308-311.
"Tenneco Develops Economic Process to Recover Ethylene from Wast Streams", The Oil and Gas Journal, Dec. 25, 1978.

Primary Examiner—Robert Spitzer
Attorney, Agent, or Firm—McAulay Fisher Nissen & Goldberg

[57] ABSTRACT

Novel adsorbents for use in the separation of carbon monoxide and/or unsaturated hydrocarbons from mixed gases.

An adsorbent for separating carbon monoxide or unsaturated hydrocarbon from mixed gases is made by heating a solid mixture comprising a copper compound and a support having a high surface area in a suitable atmosphere.

62 Claims, No Drawings

ADSORBENTS FOR USE IN THE SEPARATION OF CARBON MONOXIDE AND/OR UNSATURATED HYDROCARBONS FROM MIXED GASES

BACKGROUND OF THE INVENTION.

1. Field of the Invention

This invention relates to a new adsorbent for use in selective adsorption of carbon monoxide and unsaturated hydrocarbons, the manufacture of the adsorbent and a separating process employing the same. More specifically, this invention relates to an adsorbent having a high degree of selectivity and affinity for both carbon monoxide molecules and unsaturated hydrocarbon molecules and also having highly improved adsorptive capacity for carbon monoxide and unsaturated hydrocarbons, and a process for producing the same. More specifically, this invention relates to a CO and/or unsaturated hydrocarbon separation process employing a specially prepared adsorbent to effectively separate CO and/or unsaturated hydrocarbons from a mixed gas containing CO and/or unsaturated hydrocarbons together with a component selected from the group consisting of $H_2$, $N_2$, Ar, He, $CH_4$, $C_2H_6$, $C_3H_8$, $CO_2$, and mixtures thereof, in an efficient manner using an adsorbent having a high adsorptive capacity for CO and unsaturated hydrocarbons.

2. The Prior Art

Carbon monoxide and unsaturated hydrocarbons are basic raw materials in synthetic chemistry. In industry, the problem of separating carbon monoxide satisfactorily from mixed gases has not been solved so far. On the other hand, carbon monoxide and/or unsaturated hydrocarbons present in some raw material gases as harmful impurities are required to be removed. For instance, in ammonia plants, an ammoniacal solution of cuprous carbonate or formate has been employed for removal of carbon monoxide for many years. However, this purification process has certain shortcomings including a difficulty in controlling the operation for the prevention of the formation of precipitates, corrosion of the equipment, loss of the solution and high construction costs due to use of high pressures.

In the 1970's, the Tenneco Co. employed a toluene solution of copper(I) aluminium tetrachloride (Cu(AlCl$_4$)) as an absorbing medium, which could selectively absorb carbon monoxide or ethylene from a mixed gas (U.S. Pat. No. 3,651,159 (1972); CHEMTECH, May, 1975, p.308–311; Oil and Gas Journal, No. 52 Vol. 76 Dec. 25(1978)). The medium could absorb 1.6 m mol of CO per ml at 30° C. and 578 mm Hg of partial pressure of CO, but would lose its absorptive ability irreversibly when contacting with water. Moreover, the resulting hydrogen chloride from the hydrolysis of the medium when contacting with water would corrode the equipment involved, and the precipitates formed in the process would block up the pipes. For these reasons, the feed gas must be pretreated by zeolite adsorption to reduce its water content to less than 1 ppm. Besides, the toluene used as the solvent would volatile into the collected carbon monoxide during desorbing, which made it necessary to further separate and recover the solvent by an adsorption step with activated carbon.

In order to overcome the shortcomings in using the liquid form absorbing medium, solid form adsorbents have been proposed. In U.S. Pat. No. 4,019,879, copper(I) zeolites have been employed to separate carbon monoxide from gas streams. The Cu(I) zeolite is prepared by ion-exchange between a zeolite and a solution of cuprous salt in a non-aqueous solvent or by reduction of a Cu(II) zeolite. But its adsorptive capacity for carbon monoxide is low. It could only adsorb about 2% CO by weight of the adsorbent.

In recent years, Hirai et al. have prepared a CO adsorbent by impregnating active carbon with a toluene solution of copper(I) aluminum tetrachloride, or by steeping active carbon in a hydrochloric acid solution of cuprous chloride, and then removing the solvent by heating or pumping (U.K. Pat. No. 2,117,265A). The adsorbent can adsorb about 1 m mol of CO or ethylene per gram of the adsorbent at 20° C. and 0.9 atm of partial pressure of CO.

The adsorptive capacity for carbon monoxide or ethylene of any of the solid form adsorbents mentioned above is lower than that of the toluene solution of copper(I) aluminium tetrachloride.

SUMMARY OF THE INVENTION

It has now been found that a group of solid form adsorbents have much greater adsorptive capacity for CO and/or ethylene than that of any liquid or solid form adsorbent known in the art and that they can be produced by a simple process as decribed below. These adsorbents comprise (i) a cuprous compound and (ii) a support having a sufficiently high surface area on which support said cuprous compound is supported. The adsorbents are capable of adsorbing at least 1 m mol of CO or ethylene per gram of the adsorbent at room temperature and 0.1 atm of a partial pressure of the adsorbate. Most of them have an adsorptive capacity greater than 2.0 m mol per gram of the adsorbent. These adsorbents will not be deactivated irreversibly by the water contained in a mixed gas, and can be regenerated by removing the adsorbed water out of it by heating. In addition to ethylene, other unsaturated hydrocarbons possibly present in a mixed gas, such as acetylene, propylene, benzene, and toluene, can also be adsorbed by the adsorbents. These adsorbents not only have a high adsorptive capacity for CO and ethylene, but also have an ability to remove them at very low partial pressures of the adsorbate(s). Most of them are capable of reducing the CO or ethylene content in a mixed gas to as low as 10 ppm by volume or even lower.

It is an object of this invention to provide a new solid form adsorbent for CO and unsaturated hydrocarbons, which adsorbent is a composite comprising (i) a cuprous compound and (ii) a suitable support having a sufficiently high surface area, at least a portion of said cuprous compound being supported by said support, and which adsorbent is obtainable by a process comprising heating a mixture containing said support and a copper compound selected from a cuprous compound, a cupric compound, and a combination thereof at a temperature sufficient to initiate the thermal dispersion of the copper compound onto the surface of the support for a period of time sufficient to disperse at least a portion of the copper compound onto the surface of the support (A) in a suitable reducing atmosphere to produce an active adsorbent, or (B) in an inert atmosphere or in vacuum and thereafter, just prior to use of the composite thus formed as an adsorbent if desired, (1) if the copper compound contained in the composite formed in the ambience is a cupric one, reducing at least a portion of this cupric compound to a cuprous one, or (2) if part of the copper compound contained in the composite formed in the ambience is a cupric one, reducing, if desired, at least a portion of that part to a cuprous one, to produce an active adsorbent.

It is another object of this invention to provide a process for the manufacture of a new solid form adsorbent for CO and unsaturated hydrocarbons which is a composite containing (i) a cuprous compound, and (ii) a suitable support having a sufficiently high surface area, said cuprous compound being supported by said support, which process comprises heating a mixture containing the support and a copper compound selected from the group consisting of a cuprous compound, a cupric compound, and a combination thereto at a temperature sufficient to initiate the thermal dispersion of the copper compound onto the surface of the support for a period of time sufficient to disperse at least a portion of the copper compound onto the surface of the support (A) in a suitable reducing atmosphere to produce an active adsorbent, or (B) in an inert atmosphere or in vacuum and thereafter, prior to use of the composite thus formed as an adsorbent if desired, (1) if the copper compound contained in the composite formed in the ambience is a cupric one, reducing at least a portion of this cupric compound to a cuprous one, or (2) if part of the copper compound contained in the composite formed in such an ambience is a cupric one, reducing, if desired, at least a portion of this part to a cuprous one, to produce an active adsorbent.

It is another object of this invention to provide a process for the separation of CO and/or unsaturated hydrocarbons from a mixed gas containing CO and/or unsaturated hydrocarbons together with another component selected from such as $H_2$, $N_2$, Ar, He, $CH_4$, $C_2H_6$, $C_3H_8$, $CO_2$, and mixtures thereof, which process comprises passing a stream of said mixed gas through a mass of the adsorbent at a temperature from 0° C. to 100° C. and a pressure from 1 to 100 atmospheres, and releasing the adsorbed CO and/or unsaturated hydrocarbons by heating the adsorbent and/or lowering the pressure.

DETAILED DESCRIPTION OF THE INVENTION

The adsorbents of this invention are obtained essentially as a result of the thermal dispersion of a copper compound onto the surface of a suitable support having a high surface area by the action of a surface reaction which takes place at elevated temperatures between the copper compound and the support which have been brought into contact with each other. It is believed that the adsorbents made in accordance with this invention differ fundamentally from those known in the art and that this difference is reflected in their distinguished adsorptive performance and the process by which they are prepared. Many cuprous compounds and cupric compounds or their mixtures can be used as the copper compound. Some representative examples of the copper compound which can be suitably utilized in the practice of this invention include, for example, cuprous halides, such as cuprous chloride, cuprous fluoride, cuprous bromide, and cuprous iodide; cuprous carboxylates, such as cuprous formate and cuprous acetate; cuprous oxide; cupric halides, such as cupric chloride, cupric fluoride, cupric bromide, and cupric iodide; cupric carboxylates, such as cupric acetate and cupric formate; cupric sulfate; cupric nitrate; cupric basic salts, such as basic copper(II) carbonate, basic copper(II) acetate, and basic copper(II) phosphate; and copper(II) amine complex salts, such as hexamine copper(II) chloride. Preferred copper compounds are cuprous ones, in which cuprous halides are especially preferred, with cuprous chloride being most preferred.

As the support used to produce the adsorbents of this invention, a fairly large class of solid materials may be utilized provided that they have a sufficiently high surface area and have an affinity to the copper compound. It is desirable in the preparation of the adsorbents according to the invention that the surface area of those materials used as a support is greater than 200 $m^2/g$, preferably greater than 400 $m^2/g$. Some representative examples of those materials that can be used as the support for the adsorbent of this invention include natural or synthetic zeolites, aluminum oxide, silica-alumina gel, porous aluminum phosphate, clay minerals, and the like, preferably natural or synthetic zeolites, almost all of them being commercially available. Preferred zeolites include, for example, zeolite A, zeolite X, zeolite Y, ultra stable zeolite Y, zeolite $\Omega$, zeolite ZSM, mordenite, silicalite, and their mixtures.

The cations present in these zeolites include $Na^+$ ions, $K^+$ ions, $Ca^{2+}$ ions, $Mg^{2+}$ ions, $Cu^+$ ions, $Cu^{2+}$ ions, $NH_4^+$ ions, $H^+$ ions, $Ag^+$ ions, $Fe^{2+}$ ions, $Fe^{3+}$ $Re^{3+}$ ions, and combinations thereto.

In the process for the preparation of the adsorbent according to the invention, a mixture containing the copper compound and the support is used. In a preferred embodiment of the invention the mixture is prepared simply by mixing machanically a powder form of the copper compound with the support. The mixture can also be obtained by adding to the support a solution or suspension of the copper compound in a suitable solvent and thereafter removing the solvent from the resultant mixture by heating and/or pumping. Representative examples of the solvent that can be suitably used include, for example, water, hydrochloric acid-containing aqueous solution, ammoniacal formic acid aqueous solution, primary or secondary alcohols having 1 to 7 carbon atoms, acetone, ethyl acetate, hydrocarbons having 4 to 7 carbon atoms, propionitrile, and acetonitrile.

In the above-described mixture containing the copper compound and the support, the amount of copper in the form of the copper compound is preferably from 2 to 150%, more preferably from 10 to 80%, by weight of the support.

Thereafter, the prepared mixture containing the copper compound and the support is subjected to heating. This heating step can be carried out at a temperature high enough to initiate the thermal dispersion of the copper compound onto the surface of the support, but below the temperature at and above which the structure of the support will be destroyed, for a duration of time sufficient to thermally disperse at least a portion of the copper compound onto the surface of the support. In the practice of the present invention, the heating step is preferably performed at a temperature in the range of from about 200° C. to about 800° C., for a period of time from about 1 minute to about 100 hours, preferably from about 10 minutes to about 50 hours. The heating step can be generally conducted in a suitable reducing atmosphere, such as CO, $H_2$, $C_2H_2$, $C_2H_4$, $NH_3$, and a combination thereof, preferably CO, $H_2$, and $C_2H_4$. But for those mixtures containing the copper compound selected solely from cuprous compounds and mixtures thereof, the heating step may be conducted preferably in a suitable inert atmosphere or in vacuum. The suitable inert atmosphere is $N_2$, $CH_4$, Ar, He, $CO_2$, or a mixture thereof. For those mixtures containing a cupric compound, the heating can also be carried out in an inert atmosphere or in vacuum, or simply in the air, but in case that a relatively large part of the copper compound contained in the composite so obtained is in a cupric form, it is preferred to subject the composite to a reductive activation treatment later, just prior to use of the composite as an adsorbent if desired, in order to convert the composite into an active adsorbent for use in adsorption of CO and/or unsaturated hydrocarbons in mixed gases. Activation of these composites can be conducted by means of any known reduction process in the art, for example, by heating them in an atmosphere of CO and/or $H_2$ at a temperature above 120° C. for a period of at least 1 hour.

The heating should be carried out for a time period sufficient to disperse an adsorbent effective amount of said copper compound onto the surface of the support. It is believed that the greater the amount of the copper in the form of cuprous compound thermally dispersed onto the surface of the support in the obtained adsorbent is, the greater the adsorptive capacity of the adsorbent for CO or unsaturated hydrocarbons.

The adsorbents of this invention described above can be used to separate carbon monoxide and/or unsaturated hydrocarbons from the mixed gas. The separation process comprises passing a stream of the mixed gas through an adsorber charged with the adsorbent(s) of the invention. The adsorbed CO and/or unsaturated hydrocarbons can be readily desorbed either by heating the adsorbent or by lowering the pressure, resulting in a regenerated adsorbent. The adsorbent so regenerated can be reused as an adsorbent for the separation of CO and/or unsaturated hydrocarbons from the mixed gas. Raw material gases wherein carbon monoxide and/or unsaturated hydrocarbons present as impurities can also be purified by this separation process.

Carbon monoxide is poisonous to some catalysts used in industry. The adsorbents in accordance with the present invention are capabale of reducing the CO content in a mixed gas to as low as 10 ppm by volume or even lower. They could therefore find wide applications in many commercial processes where CO must be removed from a feed gas to be treated in the presence of a CO-sensitive catalyst. For example, in ammonia plants, the methanation process could be replaced by a CO removing process using the adsorbents of the invention to remove CO from the feed gas which is to be conveyed to undergo the ammonia synthesis reaction in the presence of an iron catalyst. In this way, the drawbacks such as extra $H_2$ consumption, $CH_4$ accumulation, etc., due to use of the methanation process, could be eliminated. The CO recovered by this process could be used in making hydrogen for the synthesis of ammonia.

The abundant carbon monoxide contained in many industrial gases can also be separated and recovered by use of the adsorbents according to the present invention. These industrial gases include, for example, water-coal gas, steam reforming gas, blast furnace vent gas, steel-making furnace vent gas, coke oven gas, carbon black furnace vent gas, aluminum furnace vent gas, copper furnace vent gas, phosphor furnace vent gas, titanium dioxide furnace vent gas, and some waste gases from refinery plants or petrochemical plants. The unsaturated hydrocarbons contained in gases of oil refinery plants and petrochemical plants can also be separated by use of the adsorbents of this invention.

The invention will now be further illustrated by the following Examples. The adsorptive capacity data involved in these Examples are obtained by a common pressure volume measurement, i.e. by adding an adsorbent into a glass container; introducing an adsorbate-containing gas into it; measuring the pressures before and after the adsorption course; and calculating the adsorptive capacity datum from the pressure difference obtained and the volume of the container. Any one of the adsorbents involved in Examples 2–51, after adsorbing an adsorbate, can be regenerated at 150° C. as the adsorbent of Example 1.

All of the given Examples are merely for the purpose of illustration and are not to be regarded as limiting the scope of the invention or the manner in which it can be practised.

EXAMPLE 1

1.0 g of zeolite 5A was mixed with 0.24 g of cuprous chloride and then heated at 600° C. for 0.5 hours in nitrogen atmosphere. The product could adsorb 2.1 m mol of CO per gram of the zeolite at 18° C. and 460 mm Hg of pressure of CO within 15 minutes. The adsorptive capacity was measured volumetrically by the pressure-volume method using a glass apparatus. The adsorbed CO was completely desorbed by evacuation at 150° C., and then the adsorbent was able to adsorb the same amount of CO under the same condition.

EXAMPLE 2

1.0 g of zeolite 5A was mixed with 0.20 g of cuprous chloride and then heated at 350° C. for 96 hours in vacuum. The product was an adsorbent which adsorbed 1.8 m mol of CO per gram of the zeolite at 18° C. and 460 mm Hg of pressure of CO.

EXAMPLE 3

1.0 g of zeolite 4A was mixed with 0.75 g of cuprous bromide and then heated at 650° C. for 14 hours in nitrogen atmosphere. The product was an adsorbent which adsorbed 2 m mol of CO per gram of the zeolite at 18° C. and 460 mm Hg of pressure of CO.

EXAMPLE 4

1.0 g of zeolite X was mixed with 0.37 g of cuprous chloride and then heated at 550° C. for 48 hours in vacuum. The product was an adsorbent which adsorbed 3.0 m mol of CO per gram of the zeolite at 18° C. and 450 mm Hg of pressure of CO.

EXAMPLE 5

1.0 g of zeolite X was mixed with 0.46 g of cuprous bromide and then heated at 350° C. for 50 hours in vacuum. The product was an adsorbent which adsorbed 3.0 m mol of CO per gram of the zeolite at 18° C. and 450 mm Hg of pressure of CO.

EXAMPLE 6

1.0 g of zeolite X was mixed with 0.36 g of cuprous chloride and then heated at 600° C. for 2 hours in nitrogen atmosphere. The product was an adsorbent which adsorbed 3.3 m mol of CO per gram of the zeolite at 20° C. and 520 mm Hg of pressure of CO.

EXAMPLE 7

1.0 g of $NH_4^+$ zeolite X was mixed with 0.44 g of cuprous acetate and then heated at 600° C. for 26 hours in vacuum. The product was an adsorbent which adsorbed 2.9 m mol of CO per gram of the zeolite at 18° C. and 450 mm Hg of pressure of CO.

EXAMPLE 8

1.0 g of Cu(II) zeolite X was mixed with 0.072 g of cuprous chloride and then heated at 450° C. for 0.5 hours in a hydrogen atmosphere. The product was an adsorbent which adsorbed 4.4 m mol of $C_2H_4$ per gram of the zeolite at 18° C. and 760 mm Hg of pressure of $C_2H_4$.

EXAMPLE 9

1.0 g of zeolite X was mixed with 0.15 g of cuprous chloride and then heated at 550° C. for 28 hours in vacuum. The product was an adsorbent which adsorbed 4.1 m mol of $C_2H_4$ per gram of the zeolite at 18° C. and 760 mm Hg of pressure of $C_2H_4$.

EXAMPLE 10

1.0 g of zeolite X was mixed with 0.64 g of cupric chloride and then heated at 350° C. for 50 hours in CO which was then removed by evacuation. The product was an adsorbent which adsorbed 3.2 m mol of $C_2H_4$ per gram of the zeolite at 18° C. and 450 mm Hg of pressure of $C_2H_4$.

EXAMPLE 11

1.0 g of zeolite X was mixed with 0.37 g of cuprous chloride and then heated at 500° C. for 18 hours in nitrogen atmosphere. The product was an adsorbent which adsorbed 3.6 m mol of $C_2H_4$ per gram of the zeolite at 18° C. and 450 mm Hg of pressure of $C_2H_4$.

EXAMPLE 12

1.0 g of zeolite X was mixed with 0.37 g of cuprous formate and then heated at 400° C. for 80 hours in vacuum. The product was an adsorbent which adsorbed 3.5 m mol of $C_2H_4$ per gram of the zeolite at 18° C. and 450 mm Hg of pressure of $C_2H_4$.

EXAMPLE 13

1.0 g of zeolite X was mixed with 0.10 g of cuprous chloride and then heated at 550° C. for 12 hours in vacuum. The product was an adsorbent which adsorbed 4.0 m mol of $C_2H_4$ per gram of the zeolite at 18° C. and 450 mm Hg of pressure of $C_2H_4$.

EXAMPLE 14

As a comparision to above examples, 1.0 g of zeolite X was mixed with 0.10 g of cuprous chloride and then heated at 550° C. for 12 hours in nitrogen atmosphere. The product only adsorbed 0.2 m mol of $N_2$ per gram of the zeolite at 18° C. and 760 mm Hg of pressure of $N_2$, and adsorbed 0.05 m mol of $H_2$ per gram of the zeolite at 18° C. and 760 mm Hg of pressure of $H_2$.

EXAMPLE 15

1.0 g of zeolite Y was mixed with 0.35 g of cuprous chloride and then heated at 350° C. for 96 hours in vacuum. The product was an adsorbent which adsorbed 3.3 m mol of CO per gram of the zeolite at 20° C. and 130 mm Hg of pressure of CO.

EXAMPLE 16

1.0 g of zeolite Y was mixed with 0.35 g of cuprous chloride and then heated at 650° C. for 24 hours in nitrogen atmosphere. The product was an adsorbent which adsorbed 3.3 m mol of CO per gram of the zeolite at 20° C. and 130 mm Hg of pressure of CO.

EXAMPLE 17

1.0 g of zeolite Y was mixed with 0.69 g of cuprous chloride and then heated at 350° C. for 46 hours in vacuum. The product was an adsorbent which adsorbed 3.6 m mol of CO per gram of the zeolite at 20° C. and 760 mm Hg of pressure of CO.

EXAMPLE 18

1.0 g of zeolite Y was mixed with 0.18 g of cuprous chloride and then heated at 700° C. for 4 hours in nitrogen atmosphere. The product was an adsorbent which adsorbed 3.6 m mol of CO per gram of the zeolite at 20° C. and 760 mm Hg of pressure of CO.

EXAMPLE 19

1.0 g of zeolite Y was mixed with 0.40 g of cuprous chloride and then heated at 550° C. for 24 hours in vacuum. The product was an adsorbent which adsorbed 2.0 m mol of CO per gram of the zeolite at 20° C. and 40 mm Hg of pressure of CO.

EXAMPLE 20

1.0 g of zeolite Y was mixed with 0.40 g of cuprous chloride and then heated at 650° C. for 10 hours in argon atmosphere. The product was an adsorbent which adsorbed 2.2 m mol of CO per gram of the zeolite at 20° C. and 110 mm Hg of pressure of CO.

EXAMPLE 21

1.0 g of zeolite Y was mixed with 0.50 g of cuprous chloride and then heated at 600° C. for 20 hours in argon atmosphere. The product was an adsorbent which adsorbed 3.2 m mol of CO per gram of the zeolite at 20° C. and 110 mm Hg of pressure of CO.

EXAMPLE 22

1.0 g of zeolite Y was mixed with 0.71 g of cuprous chloride and then heated at 650° C. for 4 hours in nitrogen atmosphere. The product was an adsorbent which adsorbed 3.1 m mol of CO per gram of the zeolite at 18° C. and 400 mm Hg of pressure of CO.

EXAMPLE 23

1.0 g of zeolite Y was mixed with 0.085 g of cuprous chloride and then heated at 350° C. for 96 hours in vacuum. The product was an adsorbent which adsorbed 3.8 m mol of ethylene per gram of the zeolite at 20° C. and 400 mm Hg of pressure of the adsorbate.

EXAMPLE 24

1.0 g of zeolite Y was mixed with 0.085 g of cuprous chloride and then heated at 750° C. for 0.5 hours in nitrogen atmosphere. The product was an adsorbent which adsorbed 3.8 m mol of ethylene per gram of the zeolite at 20° C. and 400 mm Hg of pressure of ethylene.

EXAMPLE 25

1.0 g of zeolite Y was mixed with 0.18 g of cuprous chloride and then heated at 650° C. for 24 hours in nitrogen atmosphere. The product was an adsorbent which adsorbed 3.8 m mol of ethylene per gram of the zeolite at 20° C. and 400 mm Hg of pressure of the adsorbate.

EXAMPLE 26

1.0 g of zeolite Y was mixed with 0.32 g of cuprous chloride and then heated at 550° C. for 48 hours in vacuum. The product was an adsorbent which adsorbed 3.8 m mol of ethylene per gram of the zeolite at 20° C. and 110 mm Hg of pressure of the adsorbate.

EXAMPLE 27

1.0 g of superstable zeolite Y was mixed with 0.6 g of cuprous chloride and then heated at 700° C. for 2 hours in vacuum. The product was an adsorbent which adsorbed 2.3 m mol of ethylene per gram of the zeolite at 20° C. and 110 mm Hg of pressure of the adsorbate.

EXAMPLE 28

1.0 g of zeolite Y was mixed with 0.71 g of cuprous chloride and then heated at 350° C. for 100 hours in nitrogen atmosphere. The product was an adsorbent which adsorbed 3.7 m mol of ethylene per gram of the zeolite at 20° C. and 400 mm Hg of pressure of the adsorbate.

EXAMPLE 29

As a comparision to the above examples, 1.0 g of zeolite Y was mixed with 0.71 g of cuprous chloride and then heated at 350° C. for 50 hours in vacuum. The product was an adsorbent which adsorbed 0.12 m mol of $N_2$ per gram of the zeolite at 20° C. and 760 mm Hg of pressure of $N_2$, and adsorbed 0.04 m mol of $H_2$ per gram of the zeolite at 20° C. and 760 mm Hg of pressure of $H_2$.

EXAMPLE 30

1.0 g of Cu(II) zeolite Y was reduced to Cu(I) zeolite by CO, and then mixed with 0.37 g of cuprous chloride and heated at 550° C. for 48 hours in vacuum. The product was an adsorbent which adsorbed 3.1 m mol of ethylene per gram of the zeolite at 20° C. and 20 mm Hg of pressure of the adsorbate.

EXAMPLE 31

1.0 g of $NH_4^+Y$ zeolite was mixed with 0.37 g of cuprous chloride and then heated at 650° C. for 24 hours in vacuum. The product was an adsorbent which adsorbed 2.8 m mol of CO per gram of the zeolite at 10° C. and 76 mm Hg of pressure of CO.

EXAMPLE 32

1.0 g of $NH_4^+Y$ zeolite was mixed with 0.50 g of cuprous chloride and then heated at 550° C. for 48 hours in vacuum. The product was an adsorbent which adsorbed 3.9 m mol of CO per gram of the zeolite at 10° C. and 76 mm Hg of pressure of CO.

EXAMPLE 33

1.0 g of zeolite Y was mixed with 0.60 g of cupric chloride and then heated at 550° C. for 14 hours in the air and then heated at 300° C. in CO for 1 hour. The product was an adsorbent which adsorbed 1.1 m mol of CO per gram of the zeolite at 10° C. and 76 mm Hg of pressure of CO.

EXAMPLE 34

1.0 g of zeolite Y was mixed with 0.50 g of cuprous bromide and then heated at 300° C. for 40 hours in vacuum. The product was an adsorbent which adsorbed 2.8 m mol of ethylene per gram of the zeolite at 20° C. and 100 mm Hg of pressure of the adsorbate.

EXAMPLE 35

1.0 g of zeolite 5A was mixed with 0.10 g of cuprous chloride and then heated at 300° C. for 80 hours in vacuum. The product was an adsorbent which adsorbed 2.8 m mol of ethylene per gram of the zeolite at 20° C. and 100 mm Hg of pressure of the adsorbate.

EXAMPLE 36

1.0 g of zeolite 5A was mixed with 0.21 g of cuprous chloride and then heated at 500° C. for 48 hours in nitrogen atmosphere. The product was an adsorbent which adsorbed 3.5 m mol of ethylene per gram of the zeolite at 20° C. and 400 mm Hg of pressure of the adsorbate.

EXAMPLE 37

1.0 g of zeolite 5A was mixed with 0.10 g of cuprous chloride and then heated at 500° C. for 48 hours in nitrogen atmosphere. The product was an adsorbent which adsorbed 4.0 m mol of CO per gram of the zeolite at 20° C. and 400 mm Hg of pressure of CO.

EXAMPLE 38

1.0 g of zeolite 4A was mixed with 0.10 g of cuprous chloride and then heated at 500° C. for 48 hours in nitrogen atmosphere. The product was an adsorbent which adsorbed 4.3 m mol of ethylene per gram of the zeolite at 20° C. and 400 mm Hg of pressure of the adsorbate.

EXAMPLE 39

1.0 g of zeolite 4A was mixed with 0.10 g of cuprous chloride and then heated at 500° C. for 48 hours in nitrogen atmosphere. The product was an adsorbent which adsorbed 4.0 m mol of CO per gram of the zeolite at 20° C. and 400 mm Hg of pressure of CO.

EXAMPLE 40

1.0 g of zeolite X was mixed with 0.6 g of cuprous chloride and then heated at 750° C. for 10 hours in vacuum. The product was an adsorbent which adsorbed 3.5 m mol of propylene per gram of the zeolite at 15° C. and 400 mm Hg of pressure of the adsorbate.

EXAMPLE 41

1.0 g of zeolite X was mixed with 0.10 g of cuprous chloride and then heated at 750° C. for 100 hours in nitrogen atmosphere. The product was an adsorbent which adsorbed 4.0 m mol of acetylene per gram of the zeolite at 15° C. and 400 mm Hg of pressure of acetylene.

EXAMPLE 42

1.0 g of zeolite of aluminum phosphate with silicon was mixed with 0.40 g of cuprous chloride and then heated at 550° C. for 24 hours in vacuum. The product was an adsorbent which adsorbed 2.1 m mol of $C_2H_4$ per gram of the zeolite at 12° C. and 120 mm Hg of pressure of $C_2H_4$.

EXAMPLE 43

1.0 g of zeolite X was mixed with 0.60 g of cuprous chloride and then heated at 700° C. for 1 hour in nitrogen atmosphere. The product was an adsorbent which adsorbed 2.6 m mol of benzene per gram of the zeolite at 20° C. and 100 mm Hg of vapor pressure of benzene.

EXAMPLE 44

1.0 g of zeolite X was mixed with 0.50 g of cuprous bromide and then heated at 650° C. for 24 hours in nitrogen atmosphere. The product was an adsorbent which adsorbed 2.0 m mol of toluene per gram of the zeolite at 20° C. and 100 mm Hg of vapor pressure of toluene.

EXAMPLE 45

10 g of the adsorbent, prepared in the same manner as example 6, was put into an adsorption column having an inside diameter of 15 mm. At room temperature and normal pressure, a gas mixture containing $N_2$ 20%, $H_2$ 70%, and CO 10% by volume was made to pass through the column at a flow rate of 100 ml per minute. In the first 20 minutes, the concentration of CO in the offgas was lower than 10 ppm. The total adsorption of CO by the adsorbent obtained from the break-through curve was 2.1 m mol per gram of the adsorbent. The adsorbed CO was completely desorbed and recovered at 150° C. by evacuation. The recovered CO had a purity of higher than 98 vol. %.

EXAMPLE 46

10 g of the adsorbent, prepared in the same manner as example 11, was put into an adsorption column having an inside diameter of 15 mm. At room temperature and normal pressure, a gas mixture containing $C_2H_4$ 10%, $C_2H_6$ 10%, $N_2$ 30%, $H_2$ 20%, and $CH_4$ 30% by volume was made to pass through the column at a flow rate of 100 ml per minute. In the first 20 minutes, the concentration of $C_2H_4$ in the offgas was lower than 10 ppm. The total adsorption of $C_2H_4$ by the adsorbent obtained from the break-through curve was 2.2 m mol per gram of the adsorbent. The adsorbed $C_2H_4$ was completely desorbed and recovered at 150° C. by evacuation. The recovered $C_2H_4$ had a purity of higher than 98 vol. %.

EXAMPLE 47

1.0 g of zeolite X was mixed with 0.50 g of cupric chloride and heated at 500° C. for 24 hours, and then heated under CO for 3 hours at 300° C. CO was then removed by evacuation. The product was an adsorbent, which adsorbed 3.0 m mol of CO per gram of the zeolite at 18° C. and 400 mm Hg of pressure of CO.

EXAMPLE 48

1.0 g of superstable zeolite Y was steeped into a hydrochloric acid solution containing 0.6 g of cuprous chloride, then dried at 100° C. by evacuation and heated at 600° C. for 24 hours in vacuum. The product was an adsorbent which adsorbed 3.0 m mol of CO per gram of the zeolite at 18° C. and 400 mm Hg of pressure of CO.

EXAMPLE 49

1.0 g of superstable zeolite Y was steeped into an ammoniacal aqueous solution containing 0.6 g of cuprous formate then dried at 100° C. by evacuation and heated at 600° C. for 24 hours in vacuum. The product was an adsorbent which adsorbed 3.0 m mol of CO per gram of the zeolite at 18° C. and 400 mm Hg of pressure of CO.

EXAMPLE 50

1.0 g of $\gamma$-alumina was mixed with 0.40 g of cuprous chloride and then heated at 500° C. for 4 hours. The product was an adsorbent which adsorbed 1.2 m mol of CO per gram of the alumina at 15° C. and 150 mm Hg of pressure of CO.

EXAMPLE 51

1.0 g of silica gel was mixed with 0.40 g of cuprous chloride and then heated at 500° C. for 4 hours. The product was an adsorbent which adsorbed 1.1 m mol of CO per gram of the silica gel at 15° C. and 150 mm Hg of pressure of CO.

We claim:

1. An adsorbent for use in selective adsorption of CO, unsaturated hydrocarbons, or mixtures thereof, from a mixed gas, comprising: (i) a suitable support having a sufficiently high surface area, and (ii) a cuprous compound on said support prepared by heating a solid mixture of said support and copper compound selected from the group consisting of a cuprous compound, a cupric compound and combinations thereof at a temperature and for a time period sufficient to disperse an adsorbent effective amount of said copper compound onto the surface of said support.

2. An adsorbent of claim 1 wherein said support is selected from the group consisting of a zeolite, an alumina, a silica gel, an aluminosilicate, a porous aluminum phosphate, and a combination thereof.

3. An adsorbent of claim 2 wherein said zeolite is selected from the group consisting of zeolite A, zeolite X, zeolite Y, ultra stable zeolite Y, zeolite $\Omega$, zeolite ZSM, mordenite, sillicalite and a combination thereof.

4. An adsorbent of claim 2 wherein said zeolite contains cations selected from the group consisting of $Li^+$ ions, $Na^+$ ions, $K^+$ ions, $NH_4^+$ ions, $H^+$ ions, $Ag^+$ ions, $Cu^+$ ions, $Cu^{2+}$ ions, $Mg^{2+}$ ions, $Ca^{2+}$ ions, $Fe^{2+}$ ions, $Fe^{3+}$ ions, $Re^{3+}$ ions, and a combination thereof.

5. An adsorbent of claim 1 wherein said copper compound is selected from the group consisting of cuprous halides, cuprous carboxylates, cuprous oxide, cupric halides, cupric carboxylates, cupric nitrate, cupric basic salts, hexammine cupric chloride, cupric oxide, and a combination thereof.

6. An adsorbent of claim 1 wherein the heating is conducted at a temperature in the range of from about 200° C. to about 800° C. for a period of from about 1 minute to about 100 hours.

7. An adsorbent of claim 6 wherein the heating is conducted for about 10 minutes to 50 hours.

8. An adsorbent of claim 6 wherein the heating is conducted at a temperature in the range of from about 300° C. to about 700° C.

9. An adsorbent of claim 1 wherein the amount of copper in the form of said copper compound contained in said mixture is from about 2% to about 150% by weight of said support.

10. An adsorbent of claim 1 wherein the amount of copper in the form of said copper compound contained in said mixture is from about 10% to about 80% by weigh of said support.

11. The adsorbent of claim 1 wherein the heating is carried out in a reducing atmosphere.

12. The adsorbent of claim 11 wherein the reducing atmosphere is selected from the group consisting of CO, $H_2$, $C_2H_2$, $C_2H_4$, $NH_3$, and mixtures thereof.

13. The adsorbent of claim 1 wherein the heating is carried out an inert atmosphere.

14. The adsorbent of claim 13 wherein the heating is carried out in a vacuum.

15. An adsorbent of claim 13 wherein said inert atmosphere is an atmosphere of a gas selected from $N_2$, Ar, CO, $CH_4$, He, and combinations thereof.

16. The adsorbent of claim 1 wherein at least a part of the copper compound is cupric and at least a part of said cupric portion is reduced to cuprous.

17. The adsorbent of claim 1 which is capable of adsorbing at least 1 mmol of CO or ethylene per gram of adsorbent at ambient temperature and 0.1 atm.

18. The adsorbent of claim 17 wherein the adsorptive capacity is greater than 2.0 mmol per gram of adsorbent.

19. A process for separating CO, unsaturated hydrocarbons, or mixtures thereof, from a mixed gas containing CO, unsaturated hydrocarbons, or mixtures thereof, together with a component selected from the group consisting of $H_2$, $N_2$, Ar, He, $CH_4$, $C_2H_6$, $C_3H_8$, $CO_2$, and mixtures thereof, which comprises passing said mixed gas through a mass of an adsorbent as claimed in claim 1 at a temperature in the range from 0° C. to 100° C. and a pressure from 1 to 100 atmosphere, and releasing the adsorbed CO and/or unsaturated hydrocarbons by heating the adsorbent and/or lowering the pressure.

20. A process for separating CO from a mixed gas containing CO together with a component selected from the group consisting of $H_2$, $N_2$, Ar, He, $CH_4$, $C_2H_6$, $C_3H_8$, $CO_2$, and mixtures thereof, which process comprises passing a stream of said gas through a mass of an adsorbent as claimed in claim 1 at a temperature in the range from 0° C. to 100° C. and a pressure from 1 to 100 atmosphere, and releasing the adsorbed CO by heating the adsorbent or lowering the pressure.

21. A process for separating unsaturated hydrocarbons from a mixed gas containing unsaturated hydrocarbons together with a component selected from the group consisting of $H_2$, $N_2$, Ar, He, $CH_4$, $C_2H_6$, $C_3H_8$, $CO_2$ and mixtures thereof, which process comprises passing a stream of said gas through a mass of an adsorbent as claimed in claim 1 at a temperature in the range from 0° C. to 100° C. and a pressure from 1 to 100 atmosphere, and releasing the adsorbed unsaturated hydrocarbons by heating the adsorbent or lowering the pressure.

22. An adsorbent for use in selective adsorption of CO, unsaturated hydrocarbons, or mixtures thereof, from a mixed gas, which comprises (i) a suitable support having a sufficiently high surface area, and (ii) a cuprous compound which is supported by said support and is prepared by a process comprising the step of heating a mixture of said support and a copper compound selected from the group consisting of a cuprous compound, a cupric compound and a combination thereof at a temperature in the range from about 300° C. to about 800° C. and for a period of time sufficient to disperse an adsorbent effective amount of said copper compound onto the surface of said support to produce an active adsorbent.

23. The adsorbent of claim 22 wherein the heating is carried out in a reducing atmosphere.

24. The adsorbent of claim 22 wherein the heating is carried out in an inert atmosphere.

25. The adsorbent of claim 22 wherein the heating is carried out in a vacuum.

26. The adsorbent of claim 22 wherein at least a part of the copper compound is cupric and at least a part of said cupric portion is reduced to cuprous.

27. An adsorbent for use in selective adsorption of CO, unsaturated hydrocarbons, or mixtures thereof, from a mixed gas which adsorbent comprises (i) a suitable support selected from the group consisting of a zeolite, an alumina, a silica gel, an aluminosilicate, a porous aluminum phosphate, and combinations thereof, and (ii) a cuprous compound which is supported by said support, said adsorbent being obtained by a process comprising the steps of (A) removing the solvent from a mixture containing said copper compounds, said support and a suitable solvent to produce a solid mixture, and (B) heating said solid mixture at a temperature and for a period of time sufficient to disperse an adsorbent effective amount of said copper compound onto the surface of said support to produce an active adsorbent.

28. The adsorbent of claim 27 wherein the heating is carried out in a reducing atmosphere.

29. The adsorbent of claim 27 wherein the heating is carried out in an inert atmosphere.

30. The adsorbent of claim 27 wherein the heating is carried out in a vacuum.

31. The adsorbent of claim 27 wherein at least a part of the copper compound is cupric and at least a part of said cupric portion is reduced to cuprous.

32. An adsorbent of claim 27 wherein said zeolite is selected from the group consisting of zeolite A, zeolite X, zeolite Y, ultra stable zeolite Y, zeolite $\Omega$, zeolite ZSM, mordenite, silicalite and a combination thereof.

33. An adsorbent of claim 27 wherein said zeolite contains cations selected from the group consisting of $Li^+$ ions, $Na^+$ ions, $K^+$ ions, $NH_4^+$ ions, $H^+$ ions, $Ag^+$ ions, $Cu^+$ ions, $Cu^{2+}$ ions, $Mg^{2+}$ ions, $Ca^{2+}$ ions, $Fe^{2+}$ ions, $Fe^{3+}$, $Re^{3+}$, and a combination thereof.

34. An adsorbent of claim 27 wherein said copper compound is selected from the group consisting of cuprous halide, cuprous carboxylate, cuprous oxide, cupric halide, cupric carboxylate, cupric nitrate, cupric basic salt, hexamine cupric chloride, cupric oxide, and a combination thereof.

35. An adsorbent of claim 27 wherein the heating is conducted at a temperature in the range of from about 200° C. to about 800° C. for a period of from about 1 minute to about 100 hours.

36. An adsorbent of claim 35 wherein the heating is conducted for about 10 minutes to about 50 hours.

37. An adsorbent of claim 27 wherein the heating is conducted at a temperature in the range of from about 300° C. to about 700° C.

38. An adsorbent of claim 27 wherein the amount of copper in the form of said copper compound contained in said mixture is from about 2% to about 150% by weight of said support.

39. An adsorbent of claim 27 wherein said inert atmosphere is an atmosphere of a gas selected from $N_2$, Ar, CO, $CH_4$, He, and a combination thereof, and wherein said reducing atmosphere is elected from the group consisting of CO, $H_2$, $C_2H_2$, $C_2H_4$, $NH_3$, and a mixture thereof.

40. An adsorbent of claim 27 wherein the solvent is one selected from the group consisting of water, hydrochloric acid containing aqueous solution, primary or secondary alcohols having 1 to 7 carbon atoms, acetone, ethyl acetate, hydrocarbons having 4 t 7 carbon atoms, propionitrile and acetonitrile.

41. A process for separating CO, unsaturated hydrocarbons, or mixtures thereof, from a mixed gas containing CO, unsaturated hydrocarbons, or mixtures thereof, together with a component selected from the groups consisting of $H_2$, $N_2$, Ar, He, $CH_4$, $C_2H_6$, $C_3H_8$, $CO_2$ and mixtures thereof, which process comprises passing a stream of said gas through a mass of an adsorbent as claimed in claim 27 at a temperature in the range from 0° C. to 100° C. and a pressure from 1 to 100 atmosphere, and releasing the adsorbed CO or unsaturated hydrocarbons by heating the adsorbent or lowering the pressure.

42. A process for separating CO from a mixed gas containing CO together with a component selected from the group consisting of $H_2$, $N_2$, Ar, He, $CH_4$, $C_2H_6$, $C_3H_8$, $CO_2$ and mixtures thereof, which process comprises passing a stream of said gas through a mass of an adsorbent as claimed in claim 27 at a temperature in the range from 0° C. to 100° C. and a pressure from 1 to 100 atmosphere, and releasing the adsorbed CO by heating the adsorbent or lowering the pressure.

43. A process for separating unsaturated hydrocarbons from a mixed gas containing unsaturated hydrocarbons together with a component selected from the group consisting of $H_2$, $N_2$, Ar, He, $CH_4$, $C_2H_6$, $C_3H_8$, $CO_2$ and mixtures thereof, which process comprises passing a stream of said gas through a mass of an adsorbent as claimed in claim 27 at a temperature in the range from 0° C. to 100° C. and a pressure from 1 to 100 atmosphere, and releasing the adsorbed unsaturated hydrocarbons by heating the adsorbent or lowering the pressure.

44. A process of preparing an adsorbent for use in selective adsorption of CO, unsaturated hydrocarbons, or mixtures thereof, from a mixed gas, which adsorbent comprises (i) a suitable support having a sufficiently high surface area, and (ii) a cuprous compound which is supported by said support, which process comprises the step of heating a mixture of said support and a copper compound selected from the group consisting of a cuprous compound, a cupric compound, and a combination thereof, at a temperature in the range from about 300° C. to about 800° C. and for a period of time sufficient to disperse an adsorbent effective amount of said copper compound onto the surface of said support to produce an active adsorbent.

45. The process of claim 44 wherein the heating is carried out in a reducing atmosphere.

46. The process of claim 44 wherein the heating is carried out in an inert atmosphere.

47. The process of claim 44 wherein the heating is carried out in a vacuum.

48. The process of claim 44 wherein at least a part of the copper compound is cupric and at least a part of said curpric portion is reduced to cuprous.

49. A process of claim 44 wherein said support is selected from the group consisting of a zeolite, an alumina, a silica gel, an aluminosilicate, a porous aluminum phosphate, and a combination thereof.

50. A process of claim 49 wherein said zeolite is selected from the group consisting of zeolite A, zeolite X, zeolite Y, ultra stable zeolite Y, zeolite $\Omega$, zeolite ZSM, mordenite, sillicalite, and a combination thereof.

51. A process of claim 49 wherein said zeolite contains cations selected from the group consisting of $Li^+$ ions, $Na^+$ ions, $K^+$ ions, $NH_4^+$ ions, $H^+$ ions, $Ag^+$ ions, $Cu^+$ ions, $Cu^{2+}$ ions, $Mg^{2+}$ ions, $Ca^{2+}$ ions, $Fe^{2+}$ ions, $Fe^{3+}$ ions, $Re^{3+}$ ions, and combinations thereof.

52. A process of claim 44 wherein said copper compound is selected from the group consisting of cuprous halides, cuprous carboxylates, cuprous oxide, cupric halides, cupric carboxylates, cupric nitrate, cupric basic salts, hexammine cupric chloride, cupric oxide, and a combination thereof.

53. A process of claim 44 wherein the heating is conducted for about 10 minutes to 50 hours.

54. A process of claim 44 wherein the heating is conducted at a temperature in the range of from about 300° C. to about 700° C.

55. A process of claim 44 wherein the amount of copper in the form of the copper compound contained in said mixture is from about 2 to about 150% by weight of said support.

56. A process of claim 55 wherein the amount of copper in the form of said copper compound contained in said mixture is from about 10% to about 80% by weight of said support.

57. A process of claim 44 wherein said inert atmosphere is an atmosphere of a gas selected from $N_2$, Ar, CO, $CH_4$, He, and a combination thereof, and wherein said reducing atmosphere is selected from the group consisting of CO, $H_2$, $C_2H_2$, $C_2H_4$, $NH_3$, and a mixture thereof.

58. A process of preparing an adsorbent for use in selective adsorption of CO, unsaturated hydrocarbons, or mixtures thereof, from a mixed gas, which adsorbent comprises (i) a suitable support having a sufficiently high surface area, and (ii) a cuprous compound which is supported by said support, which process comprises the step of heating a solid mixture of said support and a copper compound selected from the group consisting of a cuprous compound, a cupric compound, and a combination thereof, at a temperature and for a period of time sufficient to disperse an adsorbent effective amount of said copper compound onto the surface of said support to produce an active adsorbent.

59. The process of claim 58 wherein the heating is carried out in a reducing atmosphere.

60. The process of claim 58 wherein the heating is carried out in an inert atmosphere.

61. The process of claim 58 wherein the heating is carried out in a vacuum.

62. The process of claim 58 wherein at least a part of the copper compound is cupric and at least a part of said cupric portion is reduced to cuprous.

* * * * *